Figure 3:
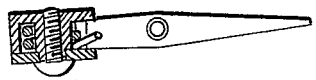
Figure 2:
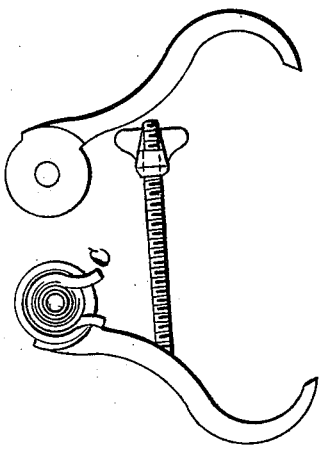
Figure 1:
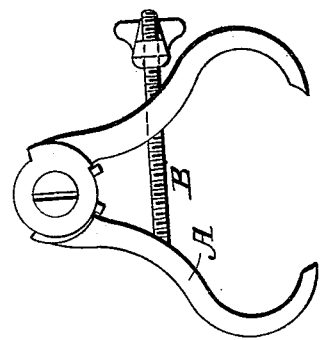

W. W. SMITH.
Calipers.

No. 7,689.

Patented Oct. 1, 1850.

UNITED STATES PATENT OFFICE.

WM. W. SMITH, OF BOSTON, MASSACHUSETTS.

SPRING-CALIPERS.

Specification of Letters Patent No. 7,689, dated October 1, 1850.

*To all whom it may concern:*

Be it known that I, WILLIAM W. SMITH, of Boston, in the county of Suffolk and State of Massachusetts, have invented a new and 5 useful Improvement in the Spring Caliper and Divider, of which the following is a full and exact description, reference being made to the inclosed drawing.

Letter A is the shank.
10 B is the cross bar and nut as usual in spring calipers and dividers.

C is the spring inclosed within the hollow head.

What I claim as my improvement and wish to secure by Letters Patent is— 15

The circular spring inclosed within the hollow head resting on the pivot on which the two parts turn and acting on the two parts (or shanks) throwing them outward against the nut on the cross bar.

WM. W. SMITH.

Witnesses:
JOSHUA STEVENS,
E. V. B. HOLCOMB.